United States Patent [19]

Suzuki et al.

[11] 3,911,218

[45] Oct. 7, 1975

[54] TIME DIVISION INFORMATION TRANSMITTING AND RECEIVING SYSTEMS

[75] Inventors: Yasoji Suzuki, Kanagawa; Tomohisa Shigematsu, Yokohama, both of Japan

[73] Assignee: Tokyo Shibaura Electric Co., Ltd., Kawasaki, Japan

[22] Filed: Sept. 17, 1973

[21] Appl. No.: 397,746

[30] Foreign Application Priority Data

Sept. 22, 1972 Japan .............................. 47-95587

Sept. 25, 1972 Japan .............................. 47-95914

[52] U.S. Cl. .......... 178/50; 179/15 BA; 179/15 BS; 179/15 A; 178/69.5 R

[51] Int. Cl.² ............................................ H04J 3/06

[58] Field of Search ........ 179/15 A, 15 BA, 15 AQ, 179/15 BS; 178/50, 69.5 R

[56] References Cited

UNITED STATES PATENTS

| | | | |
|---|---|---|---|
| 3,660,606 | 5/1972 | De Witt | 179/15 BA |
| 3,755,628 | 8/1973 | Games | 179/15 BS |
| 3,790,715 | 2/1974 | Inose | 179/15 A |
| 3,793,488 | 2/1974 | King | 179/15 BA |
| 3,804,986 | 4/1974 | Wakamatsu | 179/15 A |

*Primary Examiner*—Ralph D. Blakeslee

*Attorney, Agent, or Firm*—Flynn & Frishauf

[57] ABSTRACT

In a system of transmitting and receiving elements of information on a time division basis over a common transmission line interconnecting a plurality of stations, the information transmitting and receiving circuit of each station comprises an address counter, an address decoder, a selection code decoder, a transmission address selecting circuit and a reception address selecting circuit. The transmission address selecting circuit and reception address selecting circuit determine information transmitting and receiving time slots by a function type determining signal which is produced by the selection code decoder in response to an externally applied bias code and outputs from the address decoder.

9 Claims, 11 Drawing Figures

TIME DIVISION INFORMATION TRANSMITTING AND RECEIVING SYSTEMS

This invention relates to an information transmitting and receiving circuit for transmitting and receiving information on the time division basis over a transmission line interconnecting a plurality of spatially separated station blocks.

According to a time division transmission system elements of information are divided on the time division basis and the thus divided information is transmitted over transmission lines of a limited number (usually a single line) thus enabling to receive desired information at any desired receiving stations. For this reason, such a transmission system is advantageous in that only a small number of the transmission lines are sufficient for a control system covering a wide area.

Usually, in the time division transmission system, a plurality of stations, each comprising an address generating circuit, an address decoder, a time sharing information generating circuit and an information separating circuit are coupled together through a common transmission line. However, notwithstanding the fact that respective stations have the same capability, it is necessary to differently design respective stations only on the ground that the correspondence between information and address is not equal for respective stations. Especially, when the transmitting and receiving circuits in each station are fabricated as an integrated circuit block it is necessary to design different circuit patterns for respective stations, thereby increasing the cost of manufacturing.

It is an object of this invention to provide an improved time division information transmitting and receiving circuit capable of varying the correspondence between the information and address within the system.

SUMMARY OF THE INVENTION

In accordance with this invention there is provided a system of transmitting and receiving elements of information on a time division basis over a common transmission line interconnecting a plurality of spatially separated transmitting and receiving stations, characterized in that each station comprises an address counter which is operated in synchronism with the address counters in the other transmitting and receiving stations; an address decoder connected to receive the outputs from the address counter for producing a plurality of address decoded signals; a first means including a plurality of terminals for forming a signal utilized to select preselected information transmitting and receiving time slots in accordance with a predetermined combination of the bias voltage levels impressed upon the terminals from outside; a second means responsive to the transmission and reception time slot signal and at least one first predetermined address decoded signal from the address decoder for producing a plurality of information transmitting time division signals, the number of the time division signals corresponding to the number of elements to be transmitted; a third means responsive to the information transmitting time division signals for sending the information to the common transmission line in a predetermined sequence; a fourth means responsive to the transmission and reception time slot selection signal and at least 1 second predetermined address decoded signal from the address decoder for forming a plurality of information receiving time division signals, the number of the information receiving time division signals corresponding to the number of elements of information to be received; and a fifth means responsive to the information receiving time division signals for selectively separating the elements of information corresponding to respective ones of the information receiving time division signals among the elements of time division information which have been sent over the common transmission line from the other stations.

BRIEF DESCRIPTION OF THE DRAWINGS

This invention can be more fully understood from the following detailed description when taken in connection with the accompanying drawings, in which.

DETAILED DESCRIPTION OF ILLUSTRATED EMBODIMENTS

Figure 1:
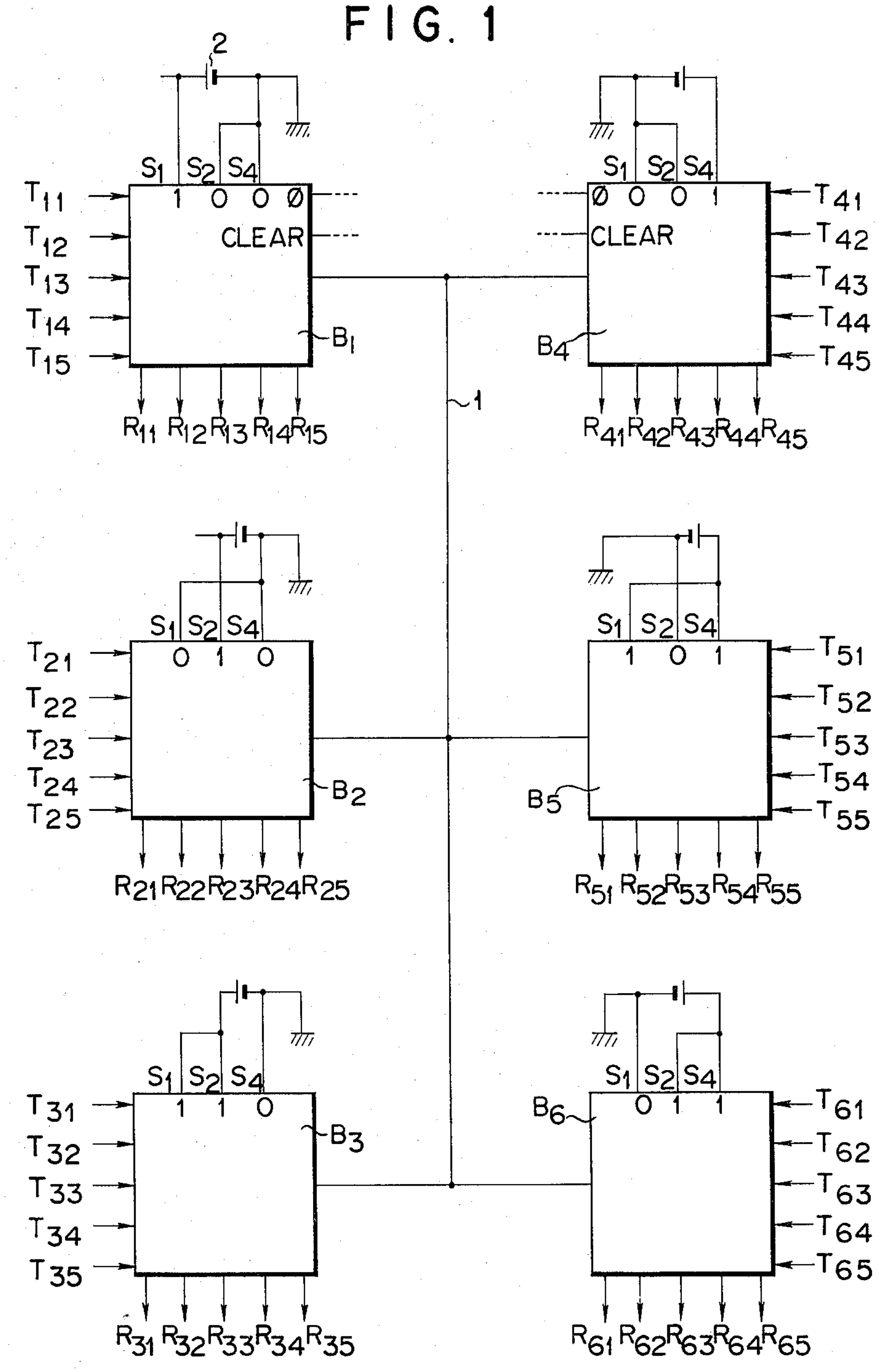
FIG. 1 is a block diagram showing one example of a time division information transmitting and receiving system made up of a plurality of stations each employing a transmitting and receiving circuit embodying the invention.

FIG. 1 of the accompanying drawings illustrates one example of an information transmitting and receiving system comprising six station blocks B1 to B6, for example. Each station block is constructed to transmit five elements of information, for example, on a time division basis and to receive five elements of information transmitted from another stations also on a time division basis. More particularly, the first station block B1 transmits information T11 to T15 to ther stations, and receives information R11 to R15 transmitted from one of the other stations. In the same manner, the station B2 transmits information T21 to T25 and receives information R21 to R25. Six stations B1 to B6 are coupled together through a wired-OR coupled transmission line 1. Each station is provided with an address counter to be described later, a line for supplying a clock pulse adapted to simultaneously drive the address counters of respective stations, a line for supplying a clear pulse to reset respective address counters at the time of energizing a source of supply, and a source line. However, for the sake of clearness, these lines are not shown in the drawing.

In the system shown in FIG. 1, in order to enable transmission and reception of the information on a time division basis, an information transmitting time slot and an information receiving time slot for respective stations are programmed beforehand. Each station is provided with function type determining terminals S1, S2 and S4 for determining the information transmitting and receiving time slots or the function type of the station. The function type is determined in accordance with a suitable combination of the levels of the bias voltages impressed upon the terminals S1, S2 and S4 from outside. In station B1, for example, a voltage level "1" is applied to the terminal S1 from a battery 2 and a voltage level "0" is applied to the terminals S2 and S4 by grounding them. Accordingly, the information transmitting time slot and the information receiving time slot of station B1 are determined intrinsically by a bias code of "100" applied to its terminals S1, S2 and S4. Different bias codes as shown in FIG. 1 are applied to the function determining terminals of other stations B2 to B5 for determining different information transmitting time slots and different information receiving time slots.

The number of the function determining terminals is determined depending upon the number of stations. Where the number of the stations is six as in the case shown, or seven or eight, three terminals suffice. However, where the number of the stations is equal to or higher than 9, it is necessary to use more than four function determining terminals.

In the system shown in FIG. 1, a total of thirty elements of information are handled. In order to accurately transmit and receive information on a time division basis it is necessary to divide the minimum sustaining period of a significant information into more than 30 sub-periods, and to transmit the information in respective sub-periods, and the time division information transmission and reception are made possible by assigning different addresses for respective sub-periods or different addresses for different information.

Figure 2:
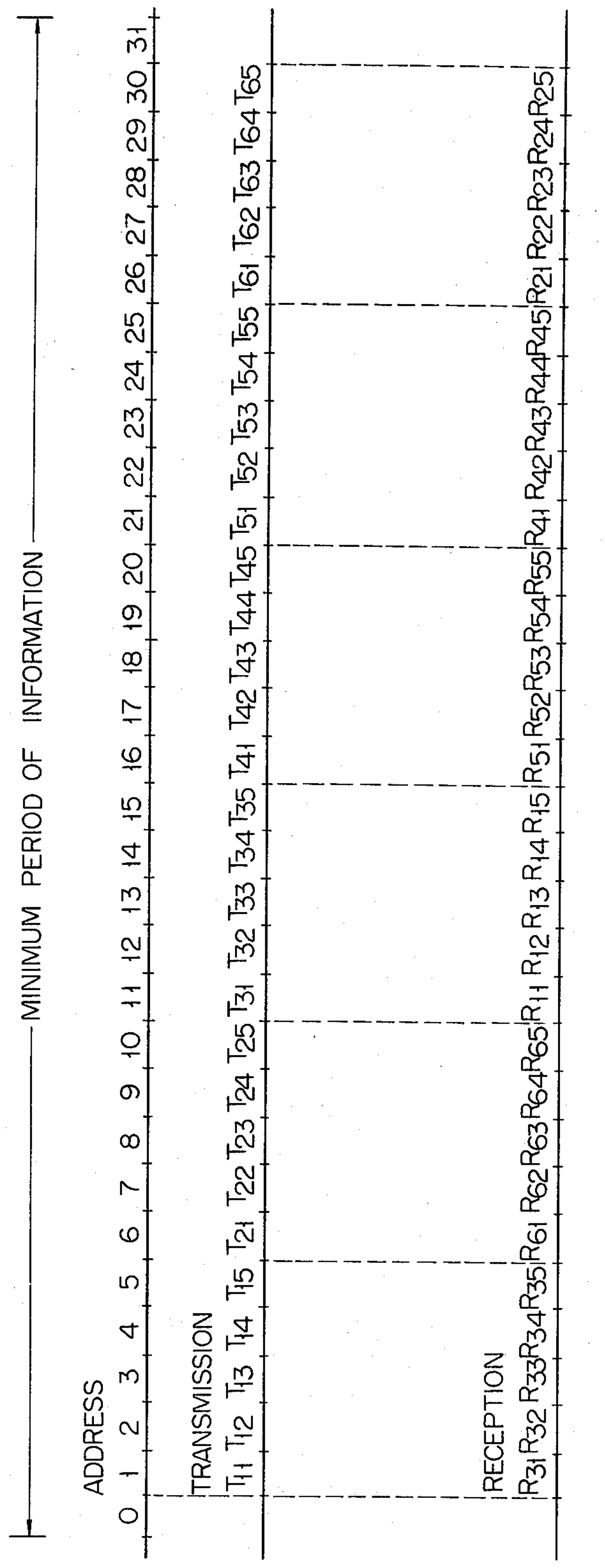
FIG. 2 is a diagram showing examples of the correspondence between information and address and the manner of transmitting and receiving information between stations.

FIG. 2 is a diagram showing an example wherein the minimum sustaining period of information is divided into 32 sub-periods and 1 to 30 addresses are assigned to each information. Addresses 0 to 31 are used for the purposes to be described hereunder other than for the transmission and reception of the information. As shown in FIG. 2, addresses 1 to 5 are assigned to the information T11 to T15 to be transmitted by the station B1, addresses 6 to 10 are assigned to the information T21 to T25 to be transmitted by station B2, addresses 1 to 15 are assigned to the information T31 to T35, to be transmitted by station B3, addresses 16 to 20 are assigned to the information T41 to T45 to be transmitted by the station B4, addresses 21 to 25 are assigned to the information T51 to T55 to be transmitted by station B5 and addresses 26 to 30 are assigned to the information T61 to T65 to be transmitted by station B6. Furthermore, FIG. 2 shows that the information T11 to T15 from station B1 is received by station B3, the information from station B2 is received by station B6, the information from station B3 is received by station B1, the information from station B4 is received by station B5, the information from station B5 is received by station B4 and the information from station B6 is received by station B2. Such an information transmitting and receiving program between respective stations is determined by the bias codes applied from external to respective stations. Where the program shown in FIG. 2 is carried out by the bias codes for respective stations shown in FIG. 1, it is possible to perform a program different from that shown in FIG. 2 by varying the bias codes impressed upon respective stations. The fact that any desired program can be provided by varying the bias codes for respective stations means that it is possible to use integrated circuits of the same pattern for the transmission and reception in respective stations, thereby greatly reducing the manufacturing cost.

Figure 3:
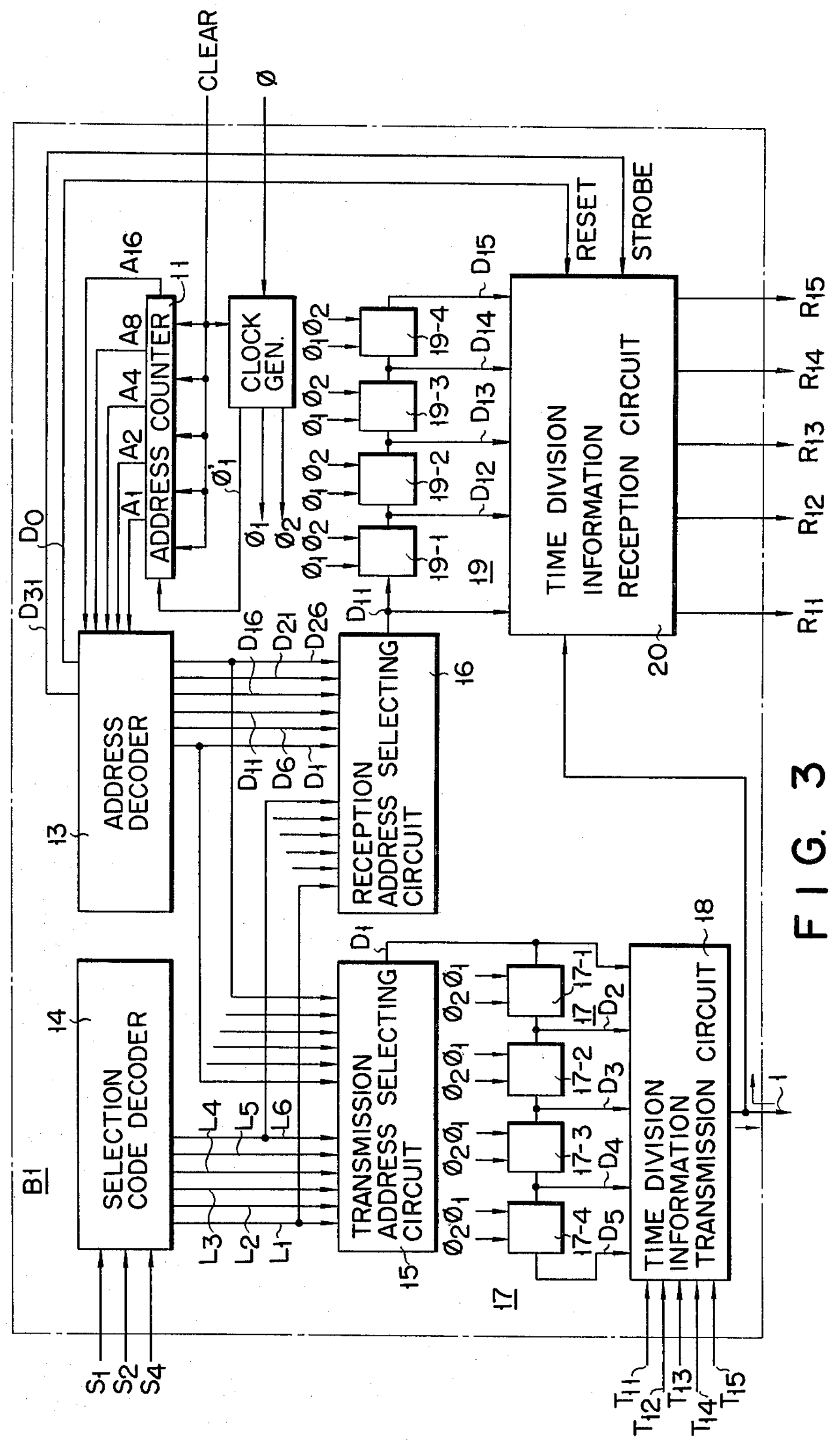
FIG. 3 shows a block diagram of one embodiment of the transmitting and receiving circuit arrangement embodying the invention.

FIG. 3 shows a block diagram of one example of the transmitting and receiving circuit arrangement embodying the invention. Since respective stations have the same circuit arrangement, that of station B1 is illustrated in detail as a representation. An address counter designated by a reference numeral 11 is reset by a clear pulse supplied to all stations when the source of supply is energized, and is driven by a counting pulse $\phi'$ which is generated by a clock generator 12 in response to a clock signal $\phi$ supplied to all stations, whereby the address counter 11 operates in synchronism with the address counters in the other stations. The clock generator 12 functions to generate two-phase shift pulses $\phi 1$ and $\phi 2$ for driving shift registers to be described later in response to the clock signal $\phi$.

Where the system is constructed to transmit and receive information according to the program shown in FIG. 2, the address counter 11 is constructed as a 32-scale counter comprising 5 bit elements. An address decoder 13 functions to receive a 5 bit binary code consisting of bits A1, A2, A4, A8 and A16 and is supplied from the address counter 11 for decoding only necessary addresses to produce address decoded signals corresponding to these addresses, respectively. Where the information is transmitted continuously from respective stations as shown in FIG. 2, the address decoder 13 provides on six output lines decoded signals D1, D6, D11, D16, D21 and D26 corresponding to addresses 1, 6, 11, 16, 21 and 26 respectively, and on the other output lines "Reset" and "Strobe" signals D0 to D31 which are used for purposes to be described later and corresponding to the addresses 0 and 31, respectively, a selection code decoder 14 is provided which in response to external bias signals S1, S2 and S4 produces a function type determining signal in accordance with the content of the bias code on one of the output lines of the number corresponding to the number of stations, that is six output lines in this example. For example, when the bias code applied to station B1 is selected as shown in FIG. 1, a signal L1 which determines a function type "I" will be provided on the first conductor. On the other hand, where the bias code applied to station B2 is selected as shown in FIG. 1 a signal L2 which determines a function type "II" will be provided on the second output line.

The outputs from the address decoder 13 and the selection code decoder 14 are sent to a transmission address selecting circuit 15 and a reception address selecting circuit 16.

The purpose of the transmission address selecting circuit 15 is to select the addresses of the information to be transmitted so that where five elements of information are to be transmitted continuously, a decoded signal from the address decoder 13 (in the case of the station B1, a decoded signal D1 as shown in FIG. 3) is selected and sent to a shift register 17 and a time division information transmission circuit 18. The shift register 17 comprises four bit register elements 17-1 to 17-4. Input information is written in respective register elements by the write pulse $\phi 1$ and is read out by the read-out pulse $\phi 2$. Accordingly, when the address counter 11 counts 1, the shift register element 17-1 supplied with the decoded signal D1 from the address decoder 13 provides an output D2 when the counter 11 counts 2. Then, the shift register elements 17-2, 17-3 and 17-4 produce sequentially outputs D3, D4 and D5 when the address counter 11 counts 3, 4 and 5. The time division signals D1 to D5 prepared in this manner are applied to the time division information transmission circuit 18 to which information T11 to T15 which are to be transmitted successively are applied, thus sequentially sending the information T11 to T15 to the transmission line 1.

In response to the output L1 from the selection code decoder 14, a reception address selecting circuit 16 sends to a shift register 19 a predetermined one of the decoded signals (in the case of the program shown in FIG. 2, decoded signal D11) from the address decoder 13. Like the shift register 17, the shift register 19 includes four bit register elements 19-1 to 19-4 for successively producing outputs D12 to D15 corresponding to addresses 12 to 15. The information reception time division signals D11 to D15 are applied sequentiallly to a time division information reception circuit 20 to which are also applied the time division information (according to the program shown in FIG. 2, information T31 to T35 from station B3) to separate five elements of information from each other. Further, the time division information reception circuit 20 is connected to receive the reset signal D0 and the strobe signal D31 from the address decoder 13.

Figure 4:
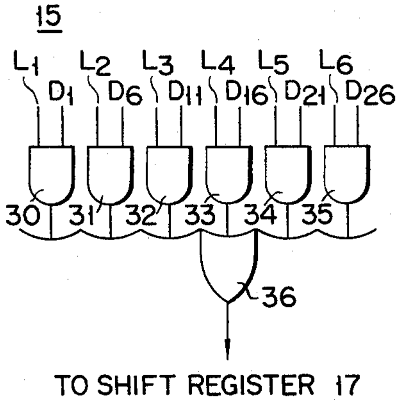
FIG. 4 is a detailed block diagram of a transmission address selecting circuit used in the present invention.

The transmission address selecting circuit 15 may be constructed as shown in FIG. 4, for example. The circuit shown in FIG. 4 comprises 6 AND gate circuits 30 to 35, one input thereof being connected to receive outputs L1 to L6 from the selection code decoder 14 whereas the other inputs to receive outputs D1, D6, D11, D16, D21 and D26 from the address decoder 13. In station B1, since output L1 alone is produced by a bias code 100, only the AND gate circuit 30 is enabled to send decoded signal D1 to the shift register 17 via an OR gate circuit 36. In the station B2, since output L2 alone is produced by the bias code applied thereto only AND gate circuit 31 is enabled to send decoded signal D6 to the shift register 17.

Figure 5:
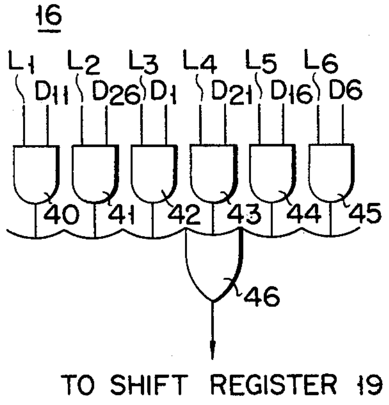
FIG. 5 is a detailed block diagram of a selection address selecting circuit for use in the present invention.

The selection address selecting circuit 16 may be constructed as shown in FIG. 5. In this circuit, the combination of the output from selection code decoder 14 and the output from the address decoder 13 is different from that of the transmission address selecting circuit 15. For example, in the case of using the program shown in FIG. 2, outputs L1 and D11 are applied to an AND gate circuit 40. In station B1 only the AND gate circuit 40 is enabled to send the decoded signal D11 to the shift register 19 through an OR gate circuit 46. In station B2, only the AND gate circuit 41 is enabled to supply the decoded signal D26 to the shift register 19.

Figure 6:
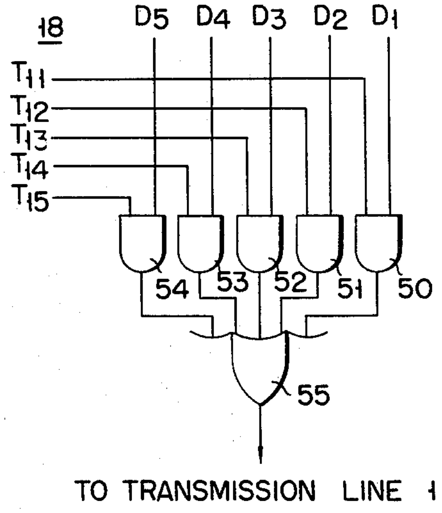
FIG. 6 is a detailed block diagram of an information transmission circuit for use in the present invention.

The information transmission circuit 18 may be constructed as shown in FIG. 6, for example, AND gate circuits 50 to 54 are connected to receive time division signals D1 to D5 and elements of information T11 to T15, respectively. In the presence of the time division signal D1, AND gate circuit 30 is enabled to send information T11 to the transmission line 1 via an OR gate circuit 55. By successive generation of time division signals D2 to D5, AND gate circuits 51 to 54 are enabled successively to send remaining elements of information T12 to T15 to the transmission line 1.

Figure 7:
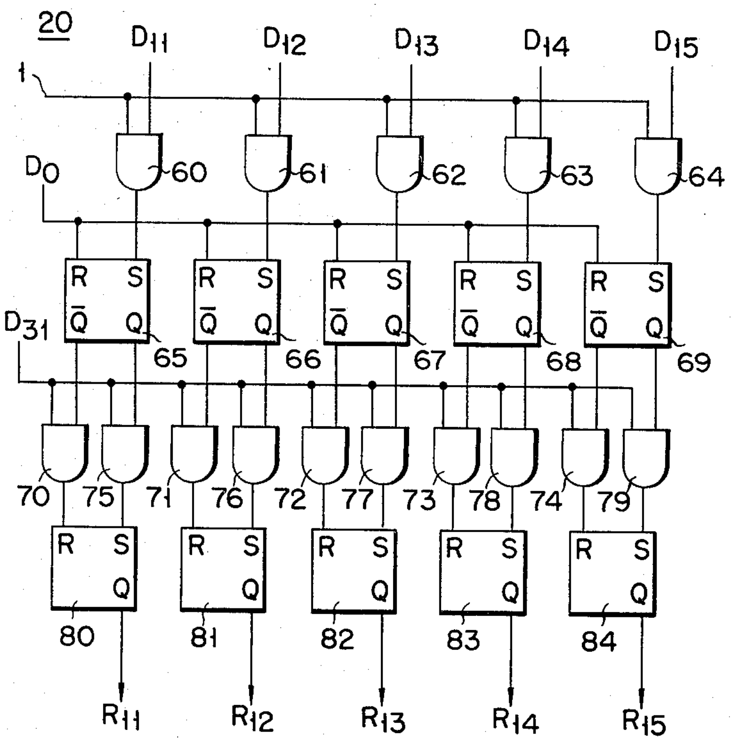
FIG. 7 is a detailed block diagram of an information reception circuit for use in the present invention.

The information reception circuit 20 may be constructed as shown in FIG. 7. AND gate circuits 60 to 64 are connected to receive at their one input information sent over the transmission line 1 and to receive at their other inputs time division signals D11 to D15. Consequently, the AND gate circuits 60 to 64 are enabled successively to separate the information which was transmitted at times of generating respectively time division signals. The outputs from AND gate circuits 60 to 64 are applied to the set input terminals S of R-S flip-flop circuits 65 to 69. The reset input terminals R of the R-S flip-flop circuits 65 to 69 are connected to receive the reset signal D0 produced by the address decoder 13 when the address counter 11 counts 0. Accordingly, the R-S flip-flop circuits 65 to 69 are reset before transmission of the information. The first outputs $\overline{Q}$ of respective R-S flip-flop circuits 65 to 69 are applied to one input of AND gate circuits 70 to 74, respectively, and the strobe signal D31 produced by address decoder 13 when the address counter 11 counts 31 is applied to the other inputs of AND gate circuits 70 to 74. The second outputs Q of the flip-flop circuits 65 to 69 are applied to one input of the AND gate circuits 75 to 79, respectively, whereas the other inputs of the AND gate circuits 75 to 79 are connected to receive the strobe signal D31. The reset terminals R of R-S flip-flop circuits 80 to 84 are connected to receive the outputs from AND gate circuits 70 to 74 respectively, whereas the set terminals S are connected to receive the outputs from the AND gate circuits 75 to 79, respectively. The information R11, R12, R13, R14 and R15 are produced on the first output terminals Q of the flip-flop circuits 80 to 84, respectively.

Figure 8:
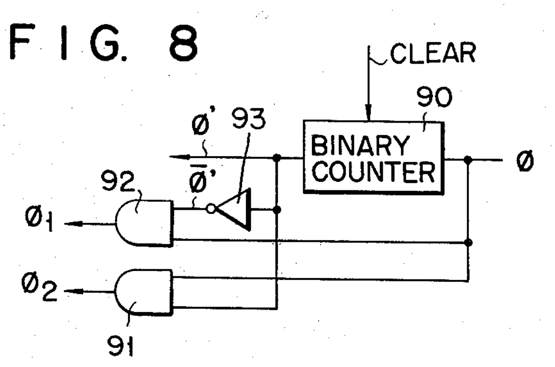
FIG. 8 is a detailed block diagram of a clock generator for use in the present invention.

The clock generator 12 may be constructed as shown in FIG. 8. The frequency of the clock signal $\phi$ supplied to all stations is reduced to one half by the action of a binary counter 90 to form a clock signal $\phi'$ adapted to drive the address counter 11. In response to the clock signals $\phi$ and $\phi'$, the AND gate circuit 91 forms the shift pulse $\phi 2$ while the AND gate circuit 92 forms the shift pulse $\phi 2$ in response to the inverted output $\overline{\phi}1$ of clock pulse $\phi'$ produced by an inverter 93 and the clock signal $\phi$.

The transmitting and receiving circuit described above can readily be fabricated as an integrated circuit including insulated-gate field effect transistors, and the address decoder 13, the selection code decoder 14 and the transmission address selection circuit 15 are fabricated as a single read only memory. Similarly, the address decoder 13, the selection code decoder 14 and the reception address selecting circuit 16 are also fabricated as another read only memory. The OR gate circuits shown in FIGS. 5, 6 and 7 may be the wired type OR gates.

Figure 9:
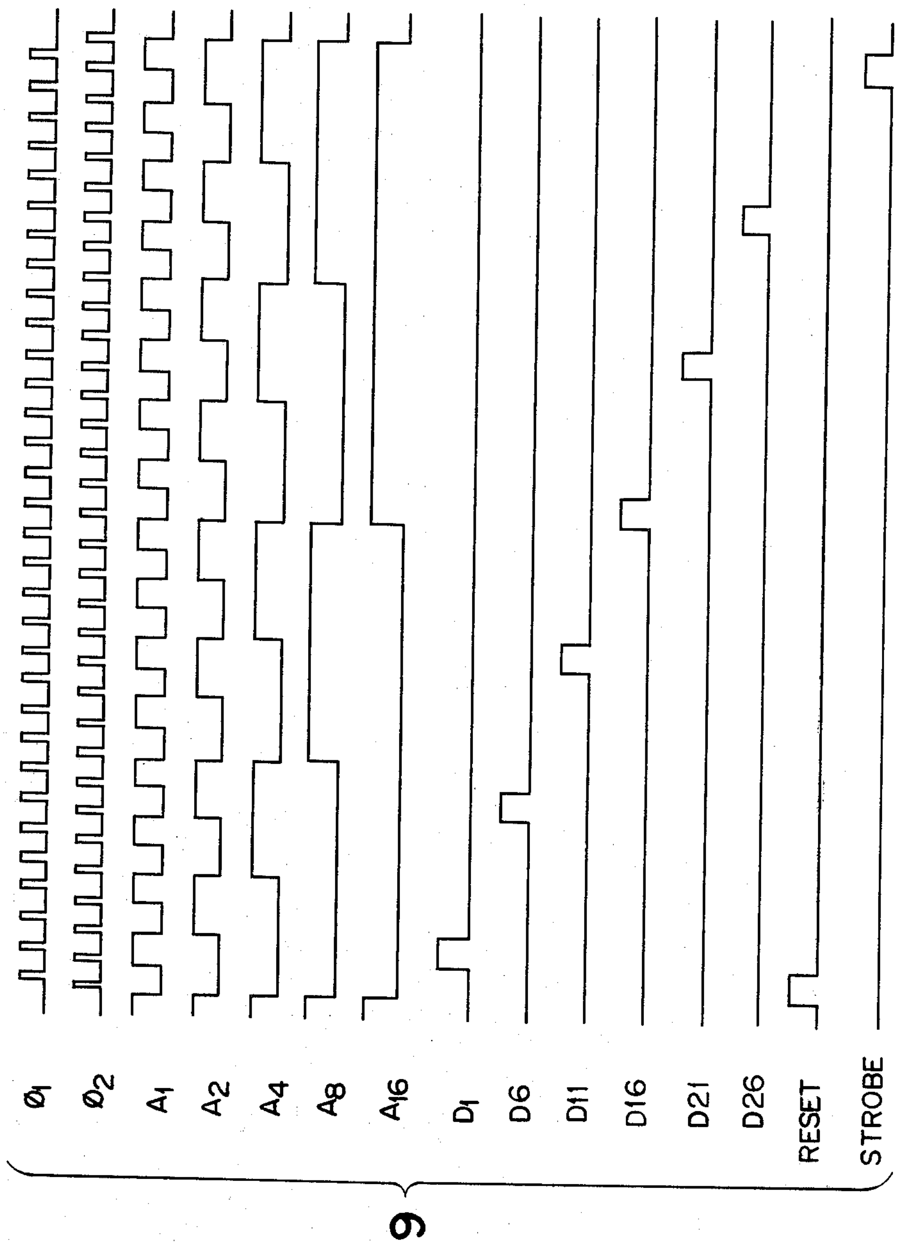
FIG. 9 shows signal waveforms helpful to the understanding of the transmitting and receiving circuit arrangement shown in FIG. 3.

The operation of the transmitting and receiving circuit shown in FIG. 3 can be readily understood by the waveforms of various signals shown in FIG. 9.

Figure 10:
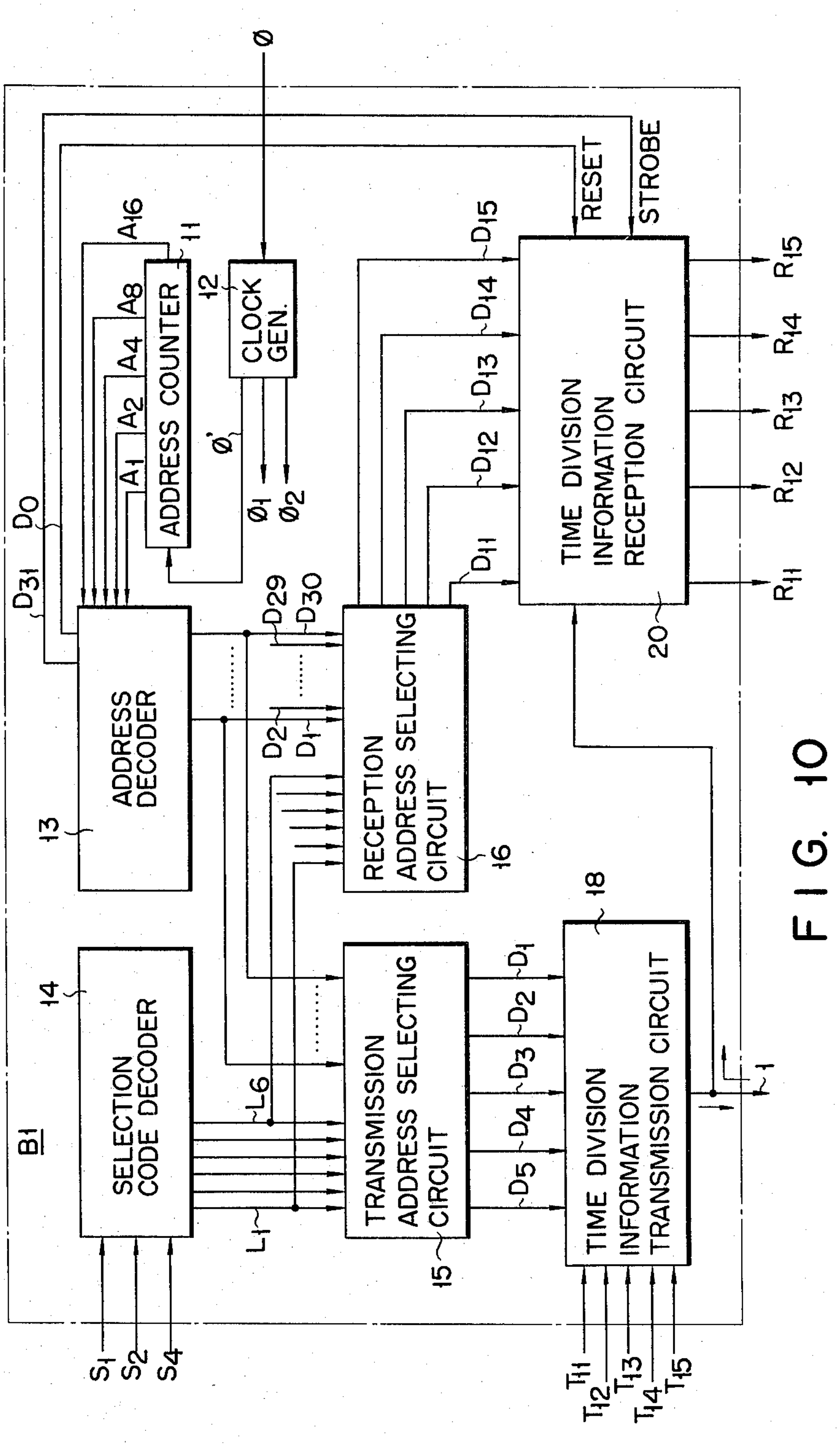
FIG. 10 is a block diagram showing a modified transmitting and receiving circuit arrangement embodying the invention.

FIG. 10 shows a modified embodiment of the transmitting and receiving circuit arrangement embodying the invention. In this embodiment, different from that shown in FIG. 3, the address decoder 13 is constructed to decode all addresses to form address decoded signals D0 to D31. In response to a single signal supplied from selection code decoder 14 for determining the function type and a predetermined number of the decoded signals from address decoder 13, transmission address selecting circuit 15 produces a predetermined number of time division signals for transmitting information. In the same manner, reception address selecting circuit 16 functions to form a predetermined number of the time division signals for receiving information in response to the single output of the selection code decoder 14 and a predetermined number of the decoded signals from the address decoder 13. In the station B1, the transmission address selecting circuit 15 successively forms the time division signals D1 to D5, as shown in the drawing, whereas the reception address selecting circuit 16 successively forms the time division signals D11 to D15.

Figure 11:
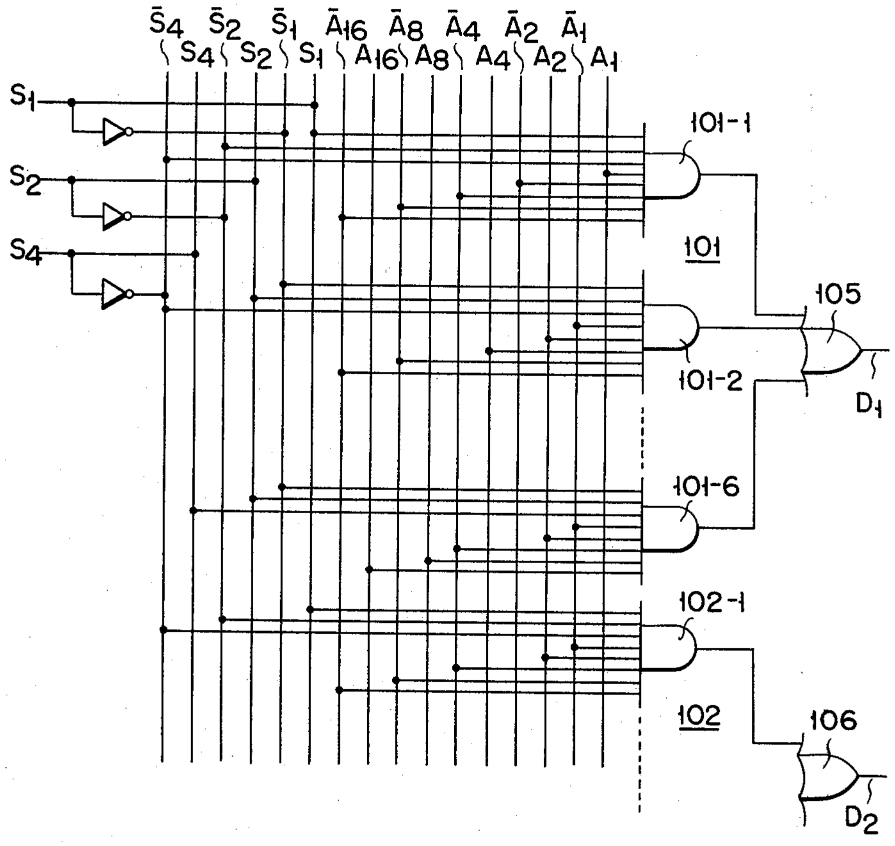
FIG. 11 is a connection diagram of part of a read only memory constituting an address decoder, a selection code decoder and a transmission address selecting circuit shown in FIG. 10.

FIG. 11 shows a portion of the read only memory comprising the address decoder 13, the selection code decoder 14 and the transmission address selecting circuit 15 shown in FIG. 10. The read only memory includes 30 AND gate circuits corresponding to the address decoded signals D1 to D30. 30 AND gate circuits are divided into 5 groups each including 6 AND gate circuits. The first group 101 includes AND gate circuits 101-1 to 101-6, and to the first AND gate circuit 101-1 are coupled bias signals S1, $\overline{\mathbf{S}}$2 and $\overline{\mathbf{S}}$4, and address counter outputs A1, $\overline{\mathbf{A}}$2, $\overline{\mathbf{A}}$4, $\overline{\mathbf{A}}$8 and $\overline{\mathbf{A}}$16. Accordingly, in the case of the station B1 which is supplied with bias code 100 as shown in FIG. 1, the first AND gate circuit 101-1 is enabled so as to form a decoded signal D1 when the address counter 11 counts 1. The decoded signal D1 is sent to the information transmission circuit 18 through OR gate circuit 105. The second AND gate circuit 101-2 is supplied with the bias signals $\overline{\mathbf{S}}$1, S2 and $\overline{\mathbf{S}}$4 and the counter outputs $\overline{\mathbf{A}}$1, A2, A4, $\overline{\mathbf{A}}$8 and $\overline{\mathbf{A}}$16. Accordingly, in the case of station B2 which is supplied with the bias code 010, the second AND gate circuit 101-2 is enabled so that when the address counter 11 counts 6, decoded signal D6 is produced which is sent to the information transmission circuit 18 via OR gate circuit 105. The first AND gate circuit 102-1 of the second group 102 is supplied with bias signals S1, $\overline{\mathbf{S}}$2 and $\overline{\mathbf{S}}$4, and the address counter outputs $\overline{\mathbf{A}}$1, A2, $\overline{\mathbf{A}}$4, $\overline{\mathbf{A}}$8 and $\overline{\mathbf{A}}$16 so that in the case of station B1, the first AND gate circuit 102-1 provides a decoded signal D2 which is sent to the information transmission circuit via OR gate circuit 106. In this manner, in the case of station B1, the first AND gate circuits of the first to fifth groups successively form decoded signals D1 to D5. In the case of station B2, the second AND gate circuits successively form decoded signals D6 to D11. Like the transmission address selecting circuit 15, the reception address selecting circuit 16 cooperates with the selection code decoder 14 and the address counter 13 to form a read only memory.

What we claim is:

1. In a system for transmitting and receiving elements of information on a time division basis over a common transmission line interconnecting a plurality of spatially separated transmitting and receiving stations, each of said stations comprising:

an address counter for counting clock signals in synchronism with the address counters in other stations;

a plurality of terminals to which bias voltages are externally applied, the bias voltages being adapted to select information transmission and reception time slots of the station as a function of a logical combination of the bias voltage levels;

first means, including an address decoder, responsive to the outputs of said address counter and the bias voltages for producing a plurality of information transmitting time division signals responsive to said address counter counting values contained in the information transmission time slot selected as a function of the logical combination of the bias voltages;

second means responsive to the outputs of said address counter and the bias voltages for producing a plurality of information receiving time division signals responsive to said address counter counting values contained in the information reception time slot selected as a function of the logical combination of the bias voltages;

third means responsive to the information transmitting time division signals for transmitting the elements of information to said common transmission line in a predetermined sequence;

fourth means responsive to the information receiving time division signals for separating the elements of information supplied from another station through said common transmission line, said fourth means including a plurality of first logic gate means, the number of first logic gate means being equal in number to the number of information elements to be received, on input of each of said first logic gate means being connected to said common transmission line and the other inputs of said first logic gate means being connected to receive corresponding information receiving time division signals; and a plurality of first flip-flop circuits, the number of said flip-flop circuits being equal to the number of said first logic gate means, each flip-flop circuit having a reset terminal, a set terminal and first and second output terminals, the reset terminal of each flip-flop circuit being connected to receive a third address decoded signal from said address decoder of said first means, and said set terminal being connected to the output of a corresponding first logic gate means.

2. A system according to claim 1 wherein said plurality of first logic gate means comprises a plurality of first AND gate means.

3. A system according to claim 1 wherein said second means comprises a plurality of gate means coupled with the outputs of said counter, one of which is enabled in accordance with the logical combination of the bias voltages to produce an output signal when said counter counts a value contained in the information reception time slot; and a shift register means having a plurality of stages cascade-connected and operative in synchronism with said counter for producing the plural information receiving time division signals in response to the output signal from said gate means.

4. A system according to claim 1 wherein said first means comprises a plurality of gate means coupled with the outputs of said counter, the number of which is greater than the number of information elements to be transmitted, a plurality of said gate means equal in number to the number of information elements to be transmitted being enabled as a function of the logical combination of the bias voltages to produce the plural information transmitting time division signals when said counter counts values contained in the information transmission time slot.

5. A system according to claim 1 wherein said second means comprises a plurality of gate means coupled with the outputs of said counter, the number of gate means of said second means being greater than the number of information elements to be received, a plurality of said gate means equal in number to the number of information elements to be received being enabled as a function of the logical combination of the bias voltages to produce the plural information receiving time division signals when said counter counts values contained in the information reception time slot.

6. A system according to claim 1 wherein said third means comprises a plurality of AND gate means, the numbers of gate means of said third means being equal in number to the number of information elements to be transmitted, each of said AND gate means being connected to receive an element of information and one of said time division signals from said second means; and means for coupling the output from said AND gate means to said common transmission line.

7. A system according to claim 2 which further comprises a plurality of second AND gate means, the number of said second AND gate means being equal to the number of said first flip-flop circuits, one input of said second AND gate means being connected to receive a fourth address decoded signal from said address decoder of said first means and the other inputs thereof being connected to receive the first outputs of corresponding first flip-flop circuits; a plurality of third AND gate means, the number of said third AND gate means being equal to the number of said first flip-flop circuits, one input of said third AND gate means being connected to receive said fourth address decoded signal, and the other inputs of said third AND gate means being connected to receive the second output of corresponding first flip-flop circuits; and a plurality of second flip-flop circuits, the number of second flip-flop circuits being equal to the number of said first flip-flop circuits, each of said second flip-flop circuits being provided with a reset terminal, a set terminal and an output terminal, said set terminal being connected to the output of a corresponding one of said second AND gate means and said set terminal being connected to the output of a corresponding one of said third AND gate means.

8. A system according to claim 1 wherein each of said stations consists of an integrated circuit block.

9. A system according to claim 1 wherein said first means comprises a plurality of gate means coupled with the outputs of said counter, one of which is enabled in accordance with the logical combination of the bias voltages to produce an output signal when said counter counts a value contained in the information transmission time slot; and a shift register means having a plurality of stages cascade-connected and operative in synchronism with said counter for producing the plural information transmitting time division signals in response to the output signal from said gate means.

* * * * *